United States Patent [19]

Magyar

[11] 3,999,723
[45] Dec. 28, 1976

[54] AUTOMATIC LOCKING RETRACTOR WITH LOCK-UP DELAY

[75] Inventor: Joseph J. Magyar, Rochester, Mich.

[73] Assignee: General Motors Corporation, Detroit, Mich.

[22] Filed: Feb. 25, 1976

[21] Appl. No.: 661,388

[52] U.S. Cl. .................. 242/107.4 A; 242/107.4 D
[51] Int. Cl.² .................. A62B 35/00; B65H 75/48
[58] Field of Search ............. 242/107.4 R–107.4 E; 280/744–747; 297/388

[56] References Cited
UNITED STATES PATENTS

| | | | |
|---|---|---|---|
| 3,724,773 | 4/1973 | Fisher | 242/107.4 D |
| 3,837,594 | 9/1974 | Lewis | 242/107.4 A |
| 3,850,383 | 11/1974 | Lewis | 242/107.4 A |
| 3,862,726 | 1/1975 | Ulrich | 242/107.4 D X |
| 3,897,913 | 8/1975 | Hall | 242/107.4 A |
| 3,901,459 | 8/1975 | Romanzi et al. | 242/107.4 A |
| 3,904,146 | 9/1975 | Erion | 242/107.4 D |

Primary Examiner—Stanley N. Gilreath
Assistant Examiner—John M. Jillions
Attorney, Agent, or Firm—Charles E. Leahy

[57] ABSTRACT

A seat belt retractor has a belt reel mounted for rotation relative a frame and a spring which biases the reel in the belt winding direction of rotation. A pawl is selectively movable between a disabled position and a position wherein the pawl engages the reel to lock the reel against belt unwinding rotation. A feeler arm on the pawl extends into engagement with the belt wound on the reel to hold the pawl in the disabled position when the belt is substantially fully wound on the reel and then permit movement of the pawl from the disabled position as the belt is unwound from the reel. An automatic locking mechanism includes a control disc which is frictionally clutched to the reel for limited rotation therewith and has an abutment for controlling movement of the pawl by moving to a blocking position in alignment with the pawl upon belt unwinding reel rotation so as to block movement of the pawl into engagement with the reel. Subsequent belt winding reel rotation moves the abutment to an unblocking position permitting movement of the pawl toward engagement with the reel. A lock-up delay mechanism includes a blocking lever which normally blocks the pawl from being operated by the control disc and is moved to an unblocking position by an inertia and attitude sensing member so that the pawl is operated by the control disc after the vehicle experiences an inertia condition or attitude change of predetermined magnitude. The pawl prevents return of the blocking lever to the position blocking operation of the pawl by the control disc until such time as the belt is substantially fully wound on the reel and the feeler arm returns the pawl to the disabled position.

6 Claims, 15 Drawing Figures

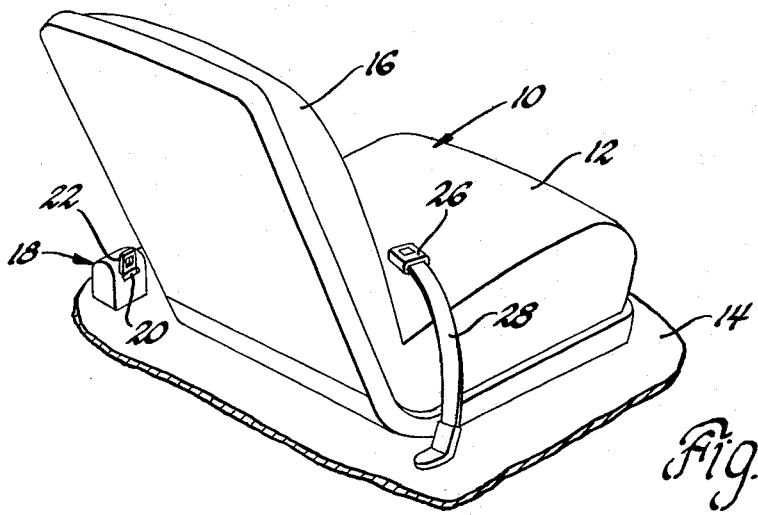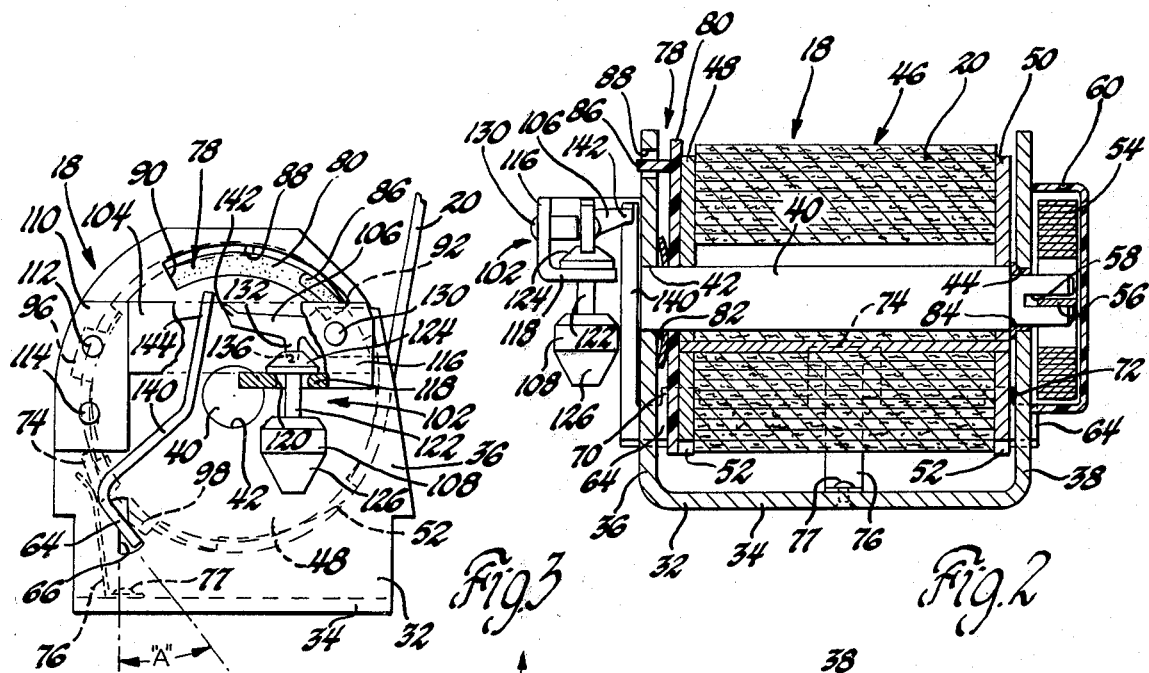

AUTOMATIC LOCKING RETRACTOR WITH LOCK-UP DELAY

BACKGROUND OF THE INVENTION

The invention relates to a seat belt retractor of the automatic locking type and more particularly provides mechanism for delaying lock up of the retractor until the vehicle experiences an attitude change or an inertia condition of predetermined magnitude.

Conventional seat belt retractors employed in motor vehicle bodies have a spring biased real which winds the seat belt to a stored position. The seat occupant may extend the seat belt by unwinding it from the reel and then engage a buckle member on the seat belt with a mating buckle member mounted on the vehicle body to fix the seat belt in a restraining position about the occupant. A locking device is provided which functions to limit unwinding of the belt beyond the extent at which effective restraint of the occupant is provided.

One well known locking device for a seat belt retractor is the so-called inertia locking device wherein the belt may be freely wound and unwound until an inertia sensing member is actuated by an inertia force of a magnitude which is indicitive of an unusually high rate of vehicle acceleration or deceleration.

Another well known type of seat belt retractor is the automatic locking retractor. In a retractor of this type, an automatic locking device is employed which prevents locking of the reel while the occupant extends the belt from a fully wound position and then permits a locking pawl to move into engagement with the reel when the belt is retracted. The pawl ratchets over the reel to permit progressive winding of the belt to a snug position about the occupant but will not permit unwinding rotation of the reel.

An advantage of the automatic locking retractor is that the locking function occurs without requiring conscious lock actuating effort on the part of the seat occupant. On the other hand, a disadvantage of the automatic locking retractor is that if the seat occupant inadvertently allows the belt to be retracted somewhat during the process of fixing the belt in its restraining position, the automatic locking device will lock the retractor against further extension. This is particularly frustrating to a seat occupant who is unfamiliar with the operation of an automatic locking retractor and requires that the belt be allowed to fully rewind on the reel before the belt can be again extended.

SUMMARY OF THE INVENTION

An automatic locking seat belt retractor of the present invention features a mechanism for delaying lock up of the retractor by the automatic locking mechanism until such time as the vehicle body experiences an inertia condition of a predetermined modest magnitude which results from an acceleration or rocking or pitching movement or attitude change of the vehicle which is experienced during normal driving manuevers. Accordingly, the automatic locking of the retractor is delayed sufficiently to allow the seat occupant the option of several reversals of winding and unwinding belt movement. This delay allows the seat occupant considerable freedom in manipulating the belt to the restraining position and then adjusting the length of the belt until the occupant finds a comfortable seating position.

A further feature of the invention is that the lock-up delay mechanism coacts with the automatic locking mechanism in such a manner that the affect of the lock-up delay mechanism is cancelled upon the sensing of the first inertia condition subsequent to belt extension so that the reel remains locked against belt unwinding and the lock-up delay mechanism is not reset until the belt is substantially fully rewound on the retractor.

A seat belt retractor according to the invention has a belt reel mounted for rotation relative a frame and has a spring which biases the reel in the belt winding direction of rotation. A pawl is selectively movable between a disabled position and a position wherein the pawl engages the reel to lock the reel against belt unwinding rotation. A feeler arm on the pawl extends into engagement with the belt wound on the reel to hold the pawl in the disabled position when the belt is substantially fully wound on the reel and then permit movement of the pawl from the disabled position as the belt is unwound from the reel. An automatic locking mechanism includes a control disc which is frictionally clutched to the reel for limited rotation therewith and has an abutment for controlling movement of the pawl by moving to a blocking position in alignment with the pawl upon belt unwinding reel rotation so as to block movement of the pawl into engagement with the reel. Subsequent belt winding reel rotation moves the abutment to an unblocking position permitting movement of the pawl toward engagement with the reel. A lock-up delay mechanism includes a blocking lever which normally blocks the pawl from being operated by the control disc and is moved to an unblocking position by an inertia and attitude sensing member so that the pawl is operated by the control disc after the reel experiences an inertia condition or attitude change of predetermined magnitude. The pawl blocks return of the blocking lever to the position blocking operation of the pawl by the control disc until such time as the belt is substantially fully wound on the reel and the feeler arm returns the pawl to the disabled position.

BRIEF DESCRIPTION OF THE DRAWINGS

These and other features, objects and advantages of the invention will become apparent upon consideration of the specification and the appended drawings in which:

FIG. 1 is a perspective view of a vehicle seat having an occupant restraint belt with a seat belt retractor according to the invention;

FIG. 2 is a frontal elevation view of a seat belt retractor according to a first embodiment of the invention and having parts broken away and in section;

FIG. 3 is a side elevation view of the seat belt retractor of FIG. 2 with the belt fully wound on the reel of the retractor;

FIG. 4 is a view similar to FIG. 3 but showing the retractor with the belt unwound somewhat from the reel;

FIG. 5 is a view similar to FIG. 4 but showing the retractor with the belt having been rewound somewhat from the position of FIG. 4;

DETAILED DESCRIPTION OF THE EMBODIMENT OF FIGS. 2 THROUGH 8

Figure 6:
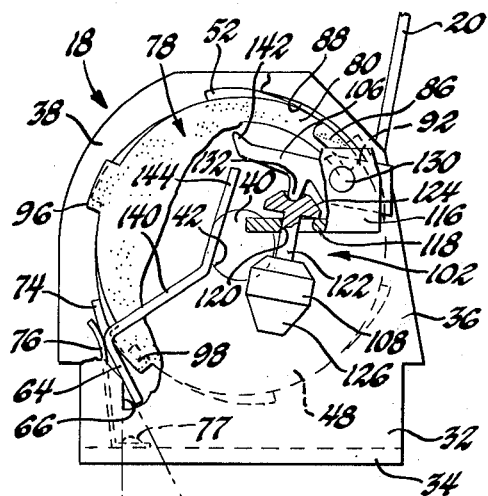
FIG. 6 is a view similar to FIG. 5 but showing the belt having been further rewound and showing the affect of an inertia stimulus on the lock-up delay mechanism of the retractor.

Referring to FIG. 1, a vehicle seat indicated generally at 10 includes a seat cushion 12 which is conventionally mounted on the floor 14 of a vehicle body and has a seat back 16. A seat belt retractor, generally indicated at 18, is attached to the vehicle floor at one side of the seat and mounts a belt 20 having a latch plate 22 attached to its end. The seat belt retractor 18 winds the belt 20 to the stored position of FIG. 1 and permits unwinding of the belt 20 from the reel to a restraining position about the body of an unshown occupant. The belt 20 is retained in the occupant restraining position by the engagement of the latch plate 22 with a seat belt buckle 26 which is attached to the vehicle floor 14 by a short length of belt 28.

Referring to FIGS. 2 and 3, the seat belt retractor 18 includes a frame 32 having a base 34 which is conventionally bolted to the vehicle floor 14 and laterally spaced upstanding walls 36 and 38. A reel shaft 40 has its ends journalled in bores 42 and 44 respectively provided in the walls 36 and 38 to mount the reel shaft 40 for rotation. A pair of ratchet plates 48 and 50 are attached to the reel shaft 40 for rotation therewith and have circumferentially spaced ratchet teeth 52 on their peripheries as best seen in FIG. 3. The reel shaft 40 and the ratchet plates 48 and 50 provide a belt reel, generally indicated at 46. The seat belt 20 is attached to the reel shaft 40 of the reel 46 and is wound on the reel shaft 40 between the ratchet plates 48 and 50.

As best seen in FIG. 2, a spiral spring 54 has an inner end 56 engaged in a slot 58 of the reel shaft 40 and has an outer end attached to a spring housing 60 which is attached to the wall 38. The spring 54 exerts a bias on the reel shaft 40 which tends to rotate the reel 46 in the direction to wind the belt 20 on the reel 46.

As best seen in FIGS. 2 and 3, a locking pawl 64 has an end pivotally mounted in a butterfly slot 66 provided in the wall 36 of the frame 32. The other end of the pawl 64 is similarily pivotally mounted in an identical butterfly opening provided in the wall 38 of the retractor frame 32. As seen in FIG. 2, the pawl 64 has tangs 70 and 72 which are engageable with the ratchet teeth 52 of the ratchet plates 48 and 50 when the pawl 64 is rotated toward engagement with the ratchet plates. A feeler arm 74 is integral with the pawl 64 centrally of the tangs 70 and 72 and extends toward engagement with the belt 20. When the belt 20 is fully wound on the reel, as shown in FIGS. 2 and 3, the feeler arm 74 engages the belt 20 and holds the pawl 64 in a disabled position shown in FIG. 3 wherein the pawl is held in a position of furthest disengagement relative the ratchet teeth 52 of the ratchet plates 48 and 50. This disabled angular position of the pawl 64 with respect to the vertical is designated angle A in FIG. 3. A spring 76 engages the feeler arm 74 and is attached to the base 34 of frame 32 by a rivet 77. The spring 76 urges the pawl toward engagement with the ratchet teeth 52 of the ratchet plates 48 and 50.

An automatic locking mechanism, generally indicated at 78, is provided for controlling movement of the pawl 64. As best seen in FIG. 2, the automatic locking mechanism 78 includes a control disc 80 which is juxtaposed with the ratchet plate 48 and urged into frictional contact therewith by a thrust spring 82 which seats against wall 36. A thrust bearing 84 is interposed between the reel shaft 40, the frame wall 38, and the ratchet plate 50 to assure free rotation of the reel 46 irrespective of the bias of the thrust spring 82. It will be understood that the frictional engagement of the control disc 80 with the ratchet plate 48 causes the control disc 80 to rotate with the reel 46.

The control disc 80 has an axially extending projection 86 which extends into a slot 88 of the wall 36. The slot 88 has an end wall 90 which is engaged by the projection 86 as shown in FIG. 4 to limit rotation of the control disc 80 with the reel 46 when the belt 20 is being unwound from the reel 46. The slot 88 also has an end wall 92 which is engaged by the projection 86 as shwon in FIG. 3 to limit rotation of the control disc 80 with the reel during belt winding rotation of the reel.

The control disc 80 has a pair of radially extending abutments 96 and 98. As seen in FIG. 3, the abutment 98 of the control disc 80 is aligned with the pawl 64 when winding rotation of the control disc 80 with the reel 46 brings the projection 86 into engagement of the end wall 92 of slot 88. Likewise, as shown in FIG. 4, the abutment 96 is stopped in alignment with the pawl 64 when unwinding rotation of the belt 20 causes the control disc 80 to rotate with the reel 46 in the belt unwinding direction and the projection 86 is carried into engagement with the end wall 90 of the slot 88. The radial extent of the abutments 96 and 98 is greater than the radial extent of the ratchet teeth 52 of the ratchet plates 48 and 50 so that alignment of the abutments 96 and 98 with the pawl 64 blocks movement of the pawl 64 into engagement with the ratchet teeth 52. Furthermore, as seen in FIG. 3, the radial extent of the abutments is short of engagement with the pawl 64 when the pawl is held in the disabled position of FIG. 3 by the feeler arm 74. The manner in which the control disc 80 of the automatic locking mechanism 78 controls the pawl 64 will be described hereinafter.

A lock-up delay mechanism, generally indicated at 102, preempts control of the pawl 64 by the control disc 80 until a predetermined condition of vehicle attitude or acceleration is sensed. The lock-up delay mechanism includes a support bracket 104, a blocking lever 106, and a pendulum 108. A base wall 110 of the support bracket 104 is attached to the wall 36 by rivets 112 and 114. A body portion 116 of the support bracket 104 is spaced laterally of the wall 36 and has a pendulum support portion 118 which is oriented to be generally parallel with the road surface and the floor 14 of the vehicle body. The pendulum support portion 118 has an aperture 120 which receives a stem 122 of the pendulum 108. The pendulum 108 has a head 124 which rests on the pendulum support portion 118 and is connected to a pendulum weight 126 by the stem 122. A sensed condition of predetermined magnitude will cause the movement of the pendulum weight 126 which in turn causes the stem 122 to pivot and the head 124 to rock up on its edge, as will be discussed hereinafter.

A pivot shaft 130 mounts the blocking lever 106 on the body portion 116 of support bracket 104. Blocking lever 106 has a leg 132 which is seated in an upwardly opening depression 136 in the top of the head 124 of the pendulum 108. Accordingly, rocking movement of the head 124 of pendulum 108 causes the blocking lever 106 to be lifted and rotated about the pivot shaft 130.

As seen in FIGS. 2 and 3, an extension arm 140 is provided on the end of the pawl 64 and extends upwardly therefrom adjacent wall 36. The blocking lever 106 has a laterally extending end 142 which extends into the plane of movement of an upper end 144 of the extension arm 140 of pawl 64. The end 142 of the blocking lever 106 and the end 144 of the extension arm 140 on the pawl 64 coact to delay locking of the reel 46 by the automatic locking mechanism 78 as will be described hereinafter.

OPERATION

Referring to FIGS. 2 and 3, the seat belt retractor 18 is shown with the belt 20 fully wound on the reel. The feeler arm 74 of the pawl 64 is engaged by the fully wound belt 20 and causes the pawl 64 to be pivoted to its disabled position of FIG. 2 wherein the pawl is poised at its angular position A furthest from engagement with the ratchet teeth 52 on ratchet plates 48 and 50. As seen in FIG. 3, the end 144 of the extension arm 140 of the pawl 64 is spaced somewhat from the end 142 of the blocking lever 106. The leg 132 of blocking lever 106 is supported by the head 124 of the pendulum 108. The head 124 of the pendulum 108 is in its normal resting position on the pendulum support portion 118 of support bracket 104.

FIG. 4 shows the seat belt retractor 18 after the belt 20 has been unwound somewhat from the reel 46. As the belt unwinding is initiated from the fully wound condition of FIG. 3, the diameter of the roll of belt 20 wound on the reel 46 decreases and engagement of the feeler arm 74 with the belt is terminated so that the pawl 64 is rotated by the pawl spring 76 toward the ratchet plates 48 and 50. This pivotal movement of the pawl 64 toward the ratchet plates is limited by engagement of the end 144 of the extension arm 140 with the end 142 of the blocking lever 106. The angular position of the pawl 64 with respect to the vertical is designated in FIG. 4 as B and is somewhat less than the angle A shown in FIG. 3 which represents the disabled position of the pawl 64. The unwinding rotation of the reel causes the control disc 80 to be rotated in the unwinding direction until its projection 86 engages the end wall 90 of the slot 88 so that the abutment 96 is aligned with the pawl 64. However, as seen in FIG. 4, the angular position of the pawl 64, as determined by the blocking lever 106, is such that there is no engagement between the abutment 96 and the pawl 64.

Referring to FIG. 5, the retractor is shown with the belt 20 having been rewound somewhat on the reel 46 from its position of FIG. 4. The end 142 of blocking lever 106 continues to engage the end 144 of extension arm 140 so as to hold the pawl 64 in its disengaged angular position B of FIG. 4. The control disc 80 rotates with the reel 46 in the winding direction so that its abutment 96 is rotated out of alignment with the pawl 64. The blocking lever 106 continues to block movement of the pawl 64 toward engagement with the ratchet plates 48 and 50. The seat occupant may repeatedly reverse the direction of rotation of the reel 46 to wind and unwind the belt as may be desired to facilitate latching of the seat belt buckle and the attainment of a comfortable position in the seat.

Referring to FIG. 6, the control disc 80 is shown in its position of FIG. 3 wherein the belt 20 has been rewound on the reel 46 such as would result after buckling of the belt about the occupant. The abutment 98 of the control disc 80 is stopped in alignment with the pawl 64. An acceleration impulse or change in attitude encountered by the vehicle body causes the pendulum 108 to pivot relative the pendulum support portion 118 of the support bracket 104 so that the head 124 of the pendulum is rocked up on its edge. This rocking movement of the head 124 of the pendulum 108 causes leg 132 of blocking lever 106 to be lifted upwardly and rotate about its pivot shaft 130 so that the end 142 of the blocking lever is lifted out of blocking engagement with the end 144 of the pawl extension arm 140. This movement of the blocking lever 106 out of engagement with the pawl extension arm 140 permits the pawl spring 76 to move the pawl 64 toward the engagement with the ratchet plates 48 and 50. However, since the abutment 98 of the control disc 80 is aligned with the pawl 64, the pawl 64 is stopped by engagement with the abutment 98 and held out of engagement with the ratchet teeth 52 and at the angular position designated C of FIG. 6.

Figure 7:
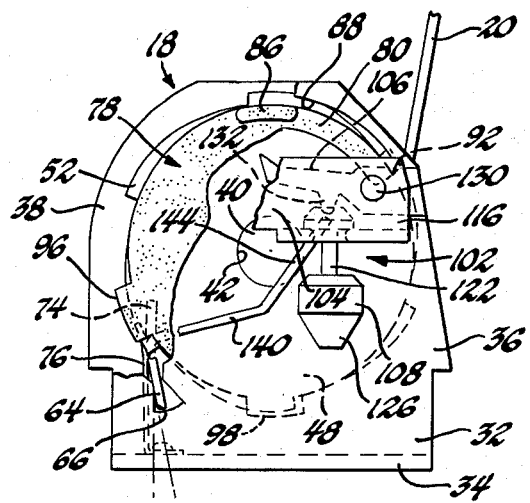
FIG. 7 is a view showing the lock-up delay mechanism after cessation of the inertia stimulus and with the pawl locking the reel against belt unwinding.

When the belt is unwound even slightly from its position of FIG. 6, the abutment 98 of the control disc 80 is carried out of blocking engagement with the pawl 64 and allows the pawl spring 76 to bias the pawl 64 into engagement with the ratchet teeth 52, as shown by the angular position D of FIG. 7. This engagement of the tangs 70 and 72 with the ratchet teeth 52 of the ratchet plates 48 and 50 as shown in FIG. 7 locks the reel 46 against belt unwinding rotation so that the occupant is restrained against movement out of the vehicle seat 10.

Figure 8:
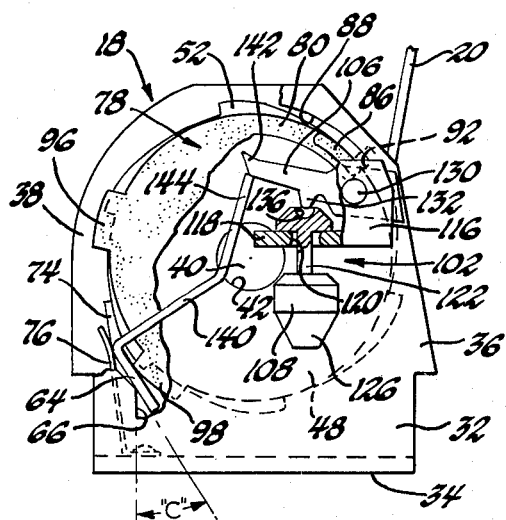
FIG. 8 is a view showing the belt retracted somewhat from the position of FIG. 7.

Referring to FIG. 8, and comparing FIG. 8 with FIG. 6, it will be seen that termination of the sensed condition of vehicle acceleration or attitude results in the head 124 of the pendulum 108 again lying flat on the pendulum support portion 118. However, the blocking lever 106 is prevented from returning to the blocking position relative the pawl extension arm 140 because the arm 142 of the blocking lever 106 rests on the end 144 of the pawl extension arm 140. The biasing effort of the pawl spring 76 acting upon the pawl 64 prevents the pawl 64 from returning to its angular position B until the belt 20 is fully rewound on the reel and engages the feeler arm 74 to move the pawl 64 to the angular position B and then restore the pawl 64 to its disabled position of angle A of FIG. 3.

Referring to FIG. 8, and comparing FIG. 8 with FIG. 7, it will be understood that the abutment 98 of the control disc 80 is carried into engagement with the pawl 64 during belt winding reel rotation and moves the pawl 64 from its engaged position of FIG. 7 to its disengaged position of FIG. 8. This movement of the pawl 64 to its angular position C of FIG. 8 prevents the pawl 64 from making an audible click which would result from ratcheting of the pawl 64 over the ratchet teeth 52 during belt winding rotation of the reel.

It is an important feature of the invention that the occupant restraining effectiveness of the seat belt retractor is not compromised even though the lock-up delay mechanism may be prematurely actuated. In this event, the retractor simply reverts to operating in the fashion of a conventional automatic locking retractor and the belt reel is locked automatically against unwinding rotation after some slight rewinding of the belt subsequent to its extension. For example, referring to FIG. 4 and assuming that the pendulum 108 holds the blocking lever 106 in its unblocking position similar to FIG. 6, the abutment 96 of control disc 80 will hold the pawl 64 away from engagement with the ratchet teeth 52 while the belt 20 is unwound. Then, when the belt is rewound somewhat, the control disc 80 rotates in the winding direction and carries the abutment 96 out of engagement with the pawl 64 so that pawl spring 76 moves the pawl 64 into locking engagement of the ratchet teeth 52 as seen in FIG. 7.

The inertia sensing pendulums 108 and 178 of the invention are preferably actuated by an acceleration induced inertia stimulus which is considerably less than the magnitude of inertia which locks retractors of the inertia locking type. For example, it is preferred that the pendulum 108 be operated by inertia forces resulting form normal driving manuevers such as vehicle cornering or even the normal rocking or pitching movement or acceleration of the vehicle which commonly occurs during the first minutes of travel of the motor vehicle. Furthermore, the pendulum 108 may be actuated by a change in attitude of th car during driving. It is recognized that a pendulum of this sensitivity may be operated inadvertently, for example, when a motor vehicle is parked on an incline.

Detailed Description of the Second Embodiment of FIGS. 9 through 15

Figure 9:
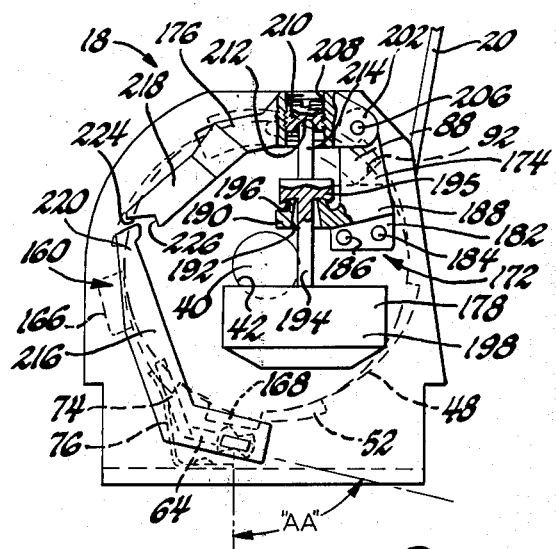
FIG. 9 is a side elevation view of a second embodiment of the invention and shows the belt fully wound by the retractor.
Figure 10:
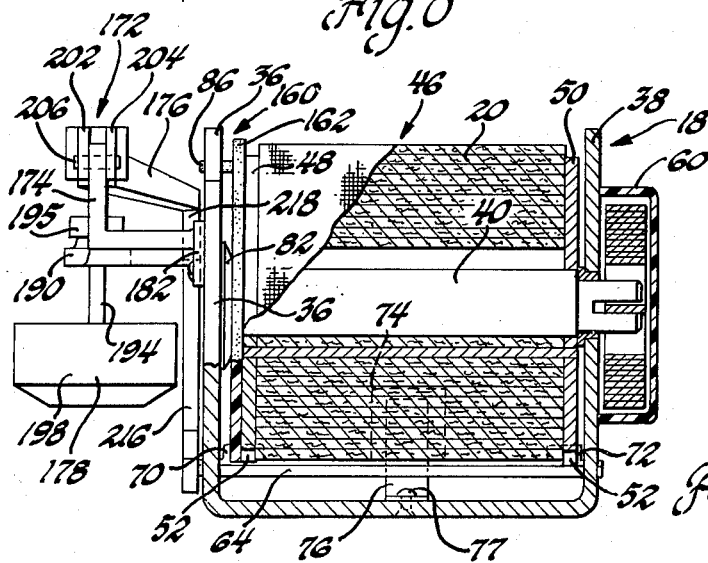
FIG. 10 is a frontal elevation view of the second embodiment of the invention and has parts broken away and in section.

Referring to FIGS. 9 and 10, a second embodiment of the invention is shown. The arrangement and structure of the second embodiment is generally similar to that of the first embodiment and accordingly the like elements are designated by like numerals.

The automatic locking mechanism generally indicated at 160 includes a control disc 162 which is juxtaposed with the ratchet plate 48 and urged into frictional contact therewith by the thrust spring 82 so that the control disc 162 rotates with the reel 46. The control disc 162 has a pair of radially extending abutments 166 and 168. As best seen in FIG. 9, the abutment 168 of the control disc 162 is aligned with the pawl 64 when winding rotation of the control disc 162 with the reel 46 brings the projection 86 into engagement of the end wall 92 of slot 88. Likewise, a shown in FIG. 11, the abutment 166 is stopped in alignment with the pawl 64 when unwinding rotation causes the control disc 80 to rotate with the reel 46 in the belt unwinding direction and the projection 86 is carried into engagement with the end wall 90 of the slot 88. The radial extent of both the abutments 166 and 168 is greater than the radial extent of the ratchet teeth 52 of the ratchet plates 48 and 50 so that alignment of either of the abutments with the pawl 64 prevents engagement of the pawl 64 with the ratchet teeth 52. Furthermore, the radial extent of the abutment 166 is greater than the radial extent of the abutment 168, for reasons which will be discussed hereinafter.

A lock-up delay mechanism, generally indicated at 172, limits control of the pawl 64 by the control disc 162 until a predetermined condition of vehicle attitude or acceleration is sensed. The lock-up delay mechanism includes support bracket 174, a blocking lever 176, and a pendulum 178. As best seen in FIG. 10, base wall 182 of the support bracket 174 is attached to the wall 36 by rivets 184 and 186. A body portion 188 of the support bracket 174 is spaced laterally of the wall 36 and has a pendulum support portion 190 which is oriented to be generally parallel with the road surface and the floor 14 of the vehicle body. The pendulum support portion 190 has an aperture 192 which receives a stem 194 of the pendulum 178. The pendulum 178 has a head 195 which rests on circumferential lip portion 196 of the pendulum support portion 190. The head 195 is connected to a pendulum weight 198 by the stem 194. A sensed condition of predetermined magnitude will cause movement of the pendulum weight 198 which in turn causes the stem 194 to pivot and the head 195 to rock up on the lip portion 196, as will be discussed hereinafter.

The blocking lever 176 has laterally spaced walls 202 and 204 which are pivotally connected to the support bracket 174 by a pivot pin 206. A threaded bore 208 threadedly receives a screw 210 which has a downwardly opening conical seat 212. A rod portion 214 of the pendulum 178 extends upwardly from the head 195 and has a rounded end which is received in the conical seat 212. Accordingly, rocking movement of the head 195 of the pendulum 178 causes the blocking lever 176 to be lifted and rotated about the pivot pin 206.

Figure 15:
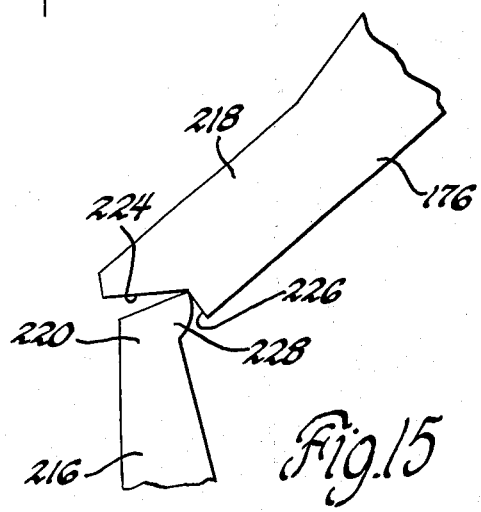
FIG. 15 is an enlarged fragmentary view of FIG. 12.

An extension arm 216 is attached to the end of the pawl 64 and extends upwardly therefrom adjacent wall 36. The blocking lever 176 has an inwardly offset end 218 which extends into the plane of movement of an upper end 220 of the extension arm 216. As best seen in FIG. 15, the end 218 has a notch defined by a horizontally extending surface 224 and a vertically extending surface 226. The upper end 220 of the extension arm 216 has a projection 228 which is engageable in the notch defined by the surfaces 224 and 226.

OPERATION

Referring to FIGS. 9 and 10, the seat belt retractor 18 is shown with the seat belt 20 fully wound on the reel. The feeler arm 74 of the pawl 64 is engaged by the fully wound belt 20 and causes the pawl 64 to be pivoted to its disabled position of FIG. 9 wherein the pawl is poised at its angular position AA furthest from engagement with the ratchet teeth 52 on ratchet plates 48 and 50. As seen in FIG. 9, the end 220 of the extension arm 216 of pawl 64 is spaced somewhat from the end 218 of the blocking lever 176. The rod portion 214 of the pendulum 178 supports the blocking lever 176 in its position of FIG. 9.

Figure 11:
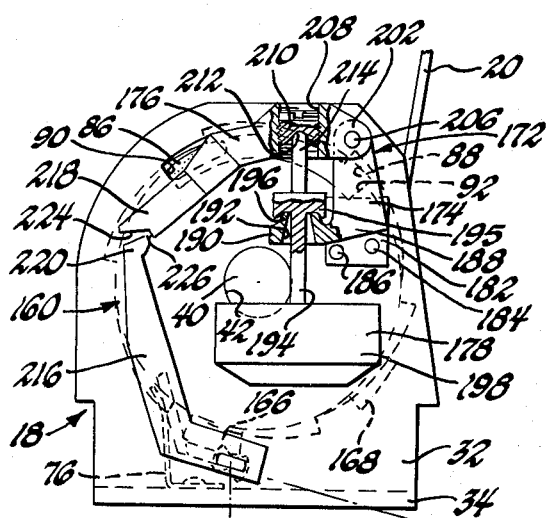
FIG. 11 is a view similar to FIG. 9 but showing the retractor with the belt having been unwound somewhat from the reel.

FIG. 11 shows the seat belt retractor 18 after the belt 20 has been unwound somewhat from the reel 46. As belt unwinding is initiated from the fully wound condition of FIG. 9, the diameter of the roll of belt 20 wound on the reel decreases and engagement of the feeler arm 74 with the belt is terminated so that the pawl 64 is rotated by the pawl spring 76 toward the ratchet plates 48 and 50. Simultaneously, the unwinding rotation of the reel causes the control disc 162 to be rotated in the unwinding direction until its projection 86 engages the end wall 90 of the slot 88 so that the abutment 166 is aligned with the pawl 64. The pivotal movement of the pawl 64 toward the ratchet plates is limited by engagement of the pawl 64 with the abutment 166 so that the pawl 64 is held at an angular position designated BB where there is no engagement between the end 220 of pawl extension arm 216 and the end 218 of the blocking lever 176.

Figure 12:
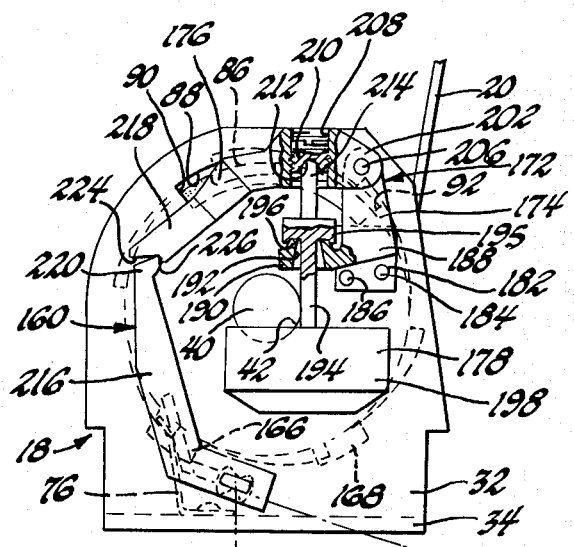
FIG. 12 is a view similar to FIG. 11 but shows the retractor with the belt having been rewound somewhat from the position of FIG. 11.

Referring to FIG. 12, the retractor is shown with the belt 20 having been rewound somewhat on the reel from its position of FIG. 11. Accordingly, the control disc 162 has been rotated with the reel 46 in the winding direction so that the abutment 166 is rotated out of alignment with the pawl 64 and the pawl spring 76 has urged the pawl 64 toward engagement with the ratchet plates 48 and 50. Movement of the pawl 64 toward engagement with the ratchet reels is limited by engagement of the end 220 of the extension arm 216 with the end 218 of the blocking lever 176. Accordingly, the pawl 64 is maintained at an angular position designated CC wherein the pawl 64 is prevented from engaging the ratchet teeth of the ratchet plates 48 and 50. Upon subsequent belt unwinding reel rotation the side of the abutment 166 is rotated into engagement with the pawl 64 as shown in FIG. 12 but it cannot be rotated into alignment with the pawl since the position of the pawl, as shown in FIG. 12, is of lesser radial extent than abutment 166.

Figure 13:
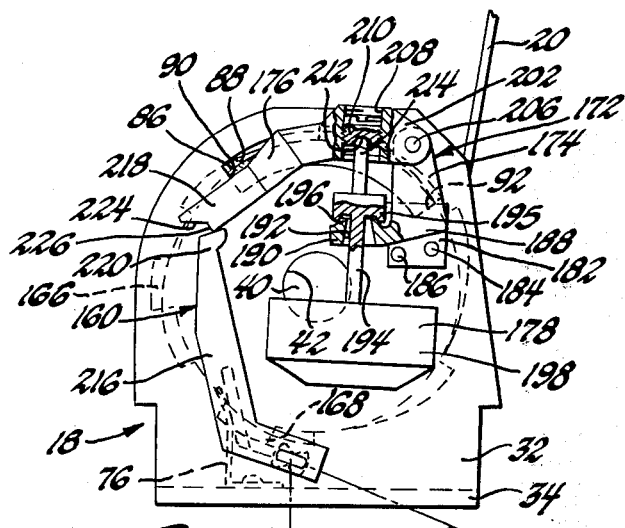
FIG. 13 is a view similar to FIG. 12 but showing the belt having been further rewound and showing the effect of an inertia stimulus on the lock-up delay mechanism of the retractor.

Referring to FIG. 13, the belt 20 is shown rewound somewhat from the position of FIG. 12 so that the abutment 168, which, as hereinbefore described, is of lesser radial extent than abutment 166, is aligned with the pawl 64. An acceleration impulse or change in attitude encountered by the vehicle body causes the pendulum 178 to pivot relative the pendulum support portion 190 causing the rod portion 214 to traverse the conical seat 212 of adjusting screw 210 so that the blocking lever 176 is lifted out of blocking engagement with the end 220 of the pawl extension arm 216. This movement of the blocking lever 176 out of engagement with the pawl extension arm 216 permits the pawl spring 76 to move the pawl 64 toward engagement with the ratchet plates 48 and 50. However, since the abutment 168 is aligned with the pawl 64, the pawl 64 is stopped by engagement with the abutment 168 and held out of engagement with the ratchet teeth 52 and at the angular position designated DD of FIG. 13. As seen in FIG. 13, the projection 228 at the upper end of the pawl extension arm 216 assumes a blocking position with respect to the blocking lever 176 so that the blocking lever 176 is held at its position of FIG. 13 irrespective of cessation of the acceleration impulse or vehicle attitude condition allowing the pendulum to assume its normal position resting on the annular lip 196 of the pendulum support position 190.

Figure 14:
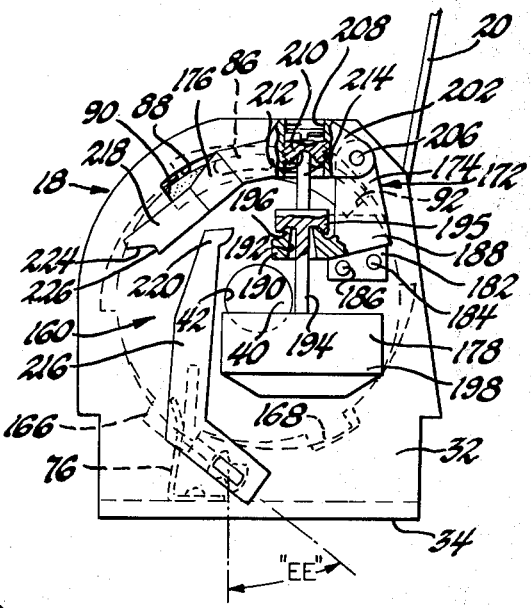
FIG. 14 is a view showing the belt having been unwound from the position of FIG. 13 and the pawl engaging the reel to block further unwinding of the belt from the reel.

When belt 20 is unwound even slightly from its position of FIG. 13, the abutment 168 of the control disc 162 is carried out of blocking engagement with the pawl 64 and allows the pawl spring 76 to bias the pawl 64 into engagement with the ratchet teeth 52 as shown by the angular position designated EE of FIG. 14. This engagement of the tangs 70 and 72 with the ratchet teeth 52 of the ratchet plates 48 and 50 locks the reel 46 against belt unwinding rotation so that the occupant is restrained against movement from the vehicle seat 10.

The biasing effort of the pawl spring 76 acting on the pawl 64 prevents the pawl 64 from returning beyond its angular position designated DD until the belt 20 is fully rewound on the reel and engages the feeler arm 74 to move the pawl 64 through the angular positions CC and BB to the initial disabled angular position AA of FIG. 9.

Comparing FIGS. 13 and 14, it will be understood that the abutment 168 of the control disc 162 is carried into engagement with the pawl 64 during belt winding reel rotation and moves the pawl 64 from its engaged position of FIG. 14 to its disengaged position of FIG. 13. This movement of the pawl 64 to its angular position DD of FIG. 13 prevents the pawl from making an audible click which would result from ratcheting of the pawl 64 over the ratchet teeth 52 during belt winding rotation of the reel. The pawl extension arm 216 blocks return movement of the blocking arm 176 to its normal position blocking the pawl.

Provision is made for adjustment of the lock-up delay mechanism to accommodate dimensional variations which may result in the manufacturing and assembly process. As best seen by referring to FIGS. 12 and 15, the blocking lever 176 can be adjusted relative the pawl extension arm 216 by turning the set screw 210. Accordingly, after the retractor is assembled, the set screw 210 is adjusted to raise or lower the blocking lever 176 until the notch in the blocking lever 176 defined by the generally horizontally extending surface 224 and the vertically extending surface 226 is engaged on the projection 228 of the pawl extension arm 216 as shown in FIG. 15.

The projection 228 forms an apex which provides a line contact with the vertically extending surface 226 so that the area of contact between the pawl extension arm 216 and the blocking lever 176 remains constant during relative motion between the pawl extension arm 216 and the blocking lever 176. It has been determined that movement of the blocking lever 176 between its blocking position of FIG. 12 and its unblocking position of FIG. 13 can be induced by a single acceleration impulse or in the alternative may be induced by a plurality of somewhat smaller acceleration impulses. For example, an inertia impulse of small magnitude may be sufficient to move the blocking lever 176 through only a small degree of rotation about the pivot pin 206 so that the projection 228 of the pawl extension arm 216 remains engaged with the blocking lever 176 but somewhere along the midpoint of the vertically extending surface 226. Then a second small inertia impulse would move the blocking lever 176 further to effect complete disengagement of the vertically extending surface 226 from the projection 228 so that the pawl is released for movement to the angular position DD of FIG. 13 or EE of FIG. 14.

Thus, it is seen that the invention provides an improved automatic locking retractor having a lock-up delay mechanism which delays lock up of the retractor until the vehicle experiences a predetermined acceleration or attitude condition. Accordingly, the seat occupant is given the option of making several reversals of winding and unwinding belt movement so that the belt can be freely manipulated and adjusted until the occupant buckles the belt and finds a comfortable seating position. Furthermore, it will be understood that the lock-up delay mechanism coacts with the automatic locking device in such a manner that the effect of the lock-up delay mechanism is cancelled upon the sensing of the first such condition subsequent to belt extension and that the lock-up delay mechanism is not reset and does not effect functioning of the automatic locking retractor until the belt is substantially fully rewound on the reel.

What is claimed is:

1. In a vehicle belt retractor having a rotatable reel for winding and unwinding a belt, spring means biasing the reel in the belt winding direction, and a pawl selectively movable through a plurality of positions between a disabled position and a position in engagement with the reel to lock the reel against belt unwinding rotation, the improvement comprising:

operating means holding the pawl in the disabled position when the belt is substantially fully wound on the reel and permitting movement of the pawl from the disabled position and toward engagement with the reel as the belt is unwound from the fully wound condition;

control means responsive to reel rotation and acting to block movement of the pawl into engagement with the reel during belt unwinding from the fully wound condition and moving to an unblocking position upon initial winding rotation of the reel to permit movement of the pawl into engagement with the reel;

blocking means for blocking the pawl irrespective of the blocking relationship of the control means, said blocking means being movable to an unblocking position so that the pawl is controlled by the control means;

means responsive to a sensed condition of vehicle acceleration or attitude for moving said blocking means to an unblocking position;

and means for maintaining the blocking means in the unblocking position irrespective of cessation of the sensed condition and until the pawl is returned to the disabled position by the operating means in response to substantial full winding of the belt on the reel.

2. In a vehicle seat belt retractor having a rotatable reel for winding and unwinding the belt, spring means biasing the reel in the belt winding direction, and a pawl selectively movable between a disabled position and a position in engagement with the reel to lock the reel against the belt unwinding rotation, the improvement comprising:

operating means holding the pawl in the disabled position when the belt is substantially fully wound on the reel and permitting movement of the pawl from the disabled position and toward engagement with the reel as the belt is unwound from the fully wound condition;

control means responsive to reel rotation and acting to control the pawl by blocking movement of the pawl into engagement with the reel during belt unwinding from the fully wound condition and moving to an unblocking position upon initial rewinding rotation of the reel to permit movement of the pawl into engagement with the reel;

a blocking member normally blocking movement of the pawl into engagement with the reel irrespective of the blocking relationship of the control means, said blocking member being selectively movable to an unblocking position permitting control of the pawl by the control means;

a sensing member responsive to a sensed condition vehicle acceleration for moving the blocking member from the blocking position to the unblocking position in response to the sensed condition;

and the pawl acting to block return of the blocking member to its position blocking the pawl until the pawl is returned to the disabled position by said operating means in response to substantial full winding of the belt on the reel.

3. In a vehicle seat belt retractor having a rotatable reel for winding and unwinding a belt, spring means biasing the reel in the belt winding direction, and a pawl selectively movable between a disabled position and a position in engagement with the reel to lock the reel against belt unwinding rotation, the improvement comprising:

operating means holding the pawl in the disabled position when the belt is substantially fully wound on the reel and permitting movement of the pawl from the disabled position toward engagement with the reel as the belt is unwound from the fully wound condition;

blocking means normally having a blocking position blocking movement of the pawl into engagement with the reel and being movable to an unblocking position so that the pawl may move toward engagement with the reel;

means responsive to a sensed condition of vehicle acceleration or attitude for moving said blocking means to an unblocking position;

a control disc clutched to the reel for limited rotation therewith and carrying an abutment rotating to a blocking position in alignment with the pawl in response to unwinding rotation of the reel, said abutment being engageable by the pawl to block movement of the pawl into engagement of the reel when the inertia responsive means is moved to the unblocking position and the abutment is in the blocking position;

winding rotation of the reel and control disc subsequent to movement of the blocking means to the unblocking position being effective to rotate the abutment of the control disc out of engagement of the pawl to allow movement of the pawl into engagement of the reel to block belt unwinding rotation;

winding rotation of the reel and control disc prior to movement of the blocking means to the unblocking position being effective to rotate the abutment of the control disc out of alignment with the pawl so that upon subsequent movement of the blocking means to the unblocking position the pawl is moved to engagement of the reel to block belt unwinding rotation;

and means acting between the pawl and the blocking means to prevent return of the blocking means from the unblocking position to the blocking position until the pawl is returned to the disabled position by the operating means in response to substantially full winding of the belt on the reel.

4. In a vehicle seat belt retractor the combination comprising:

a rotatable reel for winding and unwinding a belt;

spring means biasing the reel in the belt winding direction;

a pivotally mounted pawl selectively movable through a range of angular positions between a terminal engaged position locking the reel against belt unwinding rotation and a terminal disengaged position where the pawl is furthest from the engaged position;

a movably mounted blocking member associated with the pawl and having a blocking position limiting movement of the pawl toward the engaged position and being selectively movable to an unblocking position to permit further movement of the pawl toward the engaged position;

inertia responsive means for moving the blocking member from the blocking position to the unblocking position in response to a sensed condition of vehicle acceleration or attitude;

said further movement of the pawl upon movement of the blocking member to the unblocking position being effective to position the pawl in a blocking relationship with the blocking member to block return of the blocking member to the position blocking the pawl irrespective of the condition of the inertia responsive means;

control means responsive to reel rotation and being operatively associated with the pawl subsequent to said further movement of the pawl toward the engaged position in response to movement of the blocking member to the unblocking position, said control means acting to block movement of the pawl to the engaged position during belt unwinding from the fully wound condition and permitting movement of the pawl to the engaged position subsequent to initiation of belt rewinding rotation of the reel;

and means sensing substantial full winding of the belt on the reel for returning the pawl to the disabled position whereby the pawl is removed from the blocking relationship with respect to the blocking member to permit return of the blocking member to the position blocking the pawl.

5. In a vehicle seat belt retractor having a rotatable reel for winding and unwinding the belt, spring means biasing the reel in the belt winding direction, and a pawl selectively movable between a disabled position and a position in engagement with the reel to lock the reel against belt unwinding rotation, the improvement comprising:

operating means holding the pawl in the disabled position when the belt is substantially fully wound on the reel and permitting movement of the pawl from the disabled position and toward engagement with the reel as the belt is unwound from the fully wound condition;

control means responsive to reel rotation and acting to control the pawl by blocking movement of the pawl toward engagement with the reel during belt unwinding from the fully wound condition and being moved to an unblocking position upon initial rewinding rotation of the reel to permit further movement of the pawl toward engagement with the reel and to establish the pawl in position blocking return of the control means to the position blocking movement of the pawl upon subsequent unwinding rotation of the reel;

a blocking member engageable by the pawl upon movement of the control means to the unblocking position and acting to block movement of the pawl into engagement with the reel, said blocking member being selectively movable to an unblocking position;

a sensing member responsive to a sensed condition of vehicle acceleration for moving the blocking member from the blocking position to the unblocking position in response to the sensed condition.

said movement of the blocking member to the unblocking position permitting movement of the pawl toward engagement with the reel to lock the reel against belt unwinding rotation;

the pawl acting to block return of the blocking member to its position blocking the pawl until the operating means returns the pawl to the disabled position in response to substantial full winding of the belt on the reel.

6. In a vehicle seat belt retractor having a rotatable reel for winding and unwinding a belt, spring means biasing the reel in a belt winding direction, a pawl selectively movable to a range of angular positions between a disabled position and a position in engagement with the reel to lock the reel against belt unwinding rotation, the improvement comprising:

operating means holding the pawl in the disabled position when the belt is substantially fully wound on the reel and permitting movement of the pawl from the disabled position toward engagement with the reel as the belt is unwound from the fully wound condition;

a control disc clutched to the reel for limited rotation therewith and carrying an abutment rotating to a blocking position in alignment with the pawl in response to unwinding rotation of the reel, said abutment being engaged by the pawl to block movement of the pawl toward engagement with the reel and being disengaged from the pawl upon initiation of belt winding rotation to allow further movement of the pawl toward engagement with the reel;

said further movement of the pawl causing the pawl to block the control disc from rotating the abutment into the position blocking movement of the pawl;

blocking means normally having a blocking position blocking further movement of the pawl toward engagement with the reel and being movable to an unblocking position so that the pawl may be movable further into engagement with the reel;

means responsive to a sensed condition of vehicle acceleration or attitude for moving said blocking means to an unblocking position;

said further movement of the pawl causing the pawl to block return of the blocking means from the unblocking position to the blocking position until the pawl is returned to the disabled position by the operating means in response to substantial full winding of the belt on the reel.

said further movement of the pawl causing the pawl to block the control disc from rotating the abutment into the position blocking movement of the pawl;

blocking means normally having a blocking position blocking further movement of the pawl toward engagement with the reel and being movable to an unblocking position so that the pawl may be movable further into engagement with the reel;

means responsive to a sensed condition of vehicle acceleration or attitude for moving said blocking means to an unblocking position; to the blocking position until the pawl is returned to the disabled position by the operating means in response to substantial full winding of the belt on the reel.

* * * * *

UNITED STATES PATENT AND TRADEMARK OFFICE
CERTIFICATE OF CORRECTION

PATENT NO. : 3,999,723
DATED : December 28, 1976
INVENTOR(S) : Joseph J. Magyar

It is certified that error appears in the above-identified patent and that said Letters Patent are hereby corrected as shown below:

Column 1, line 12, "real" should read -- reel --.
Column 4, line 34, "shwon" should read -- shown --.
Column 7, line 30, "form" should read -- from --.
Column 7, line 35, "th" should read -- the --.
Column 11, Claim 1, line 4, insert -- seat -- before "belt".
Column 14, delete lines 51 through 65.

Signed and Sealed this

Seventh Day of June 1977

[SEAL]

Attest:

RUTH C. MASON
*Attesting Officer*

C. MARSHALL DANN
*Commissioner of Patents and Trademarks*